S. DOTY.
PERCOLATING BAG HOLDER.
APPLICATION FILED NOV. 29, 1910.
1,002,376.
Patented Sept. 5, 1911.
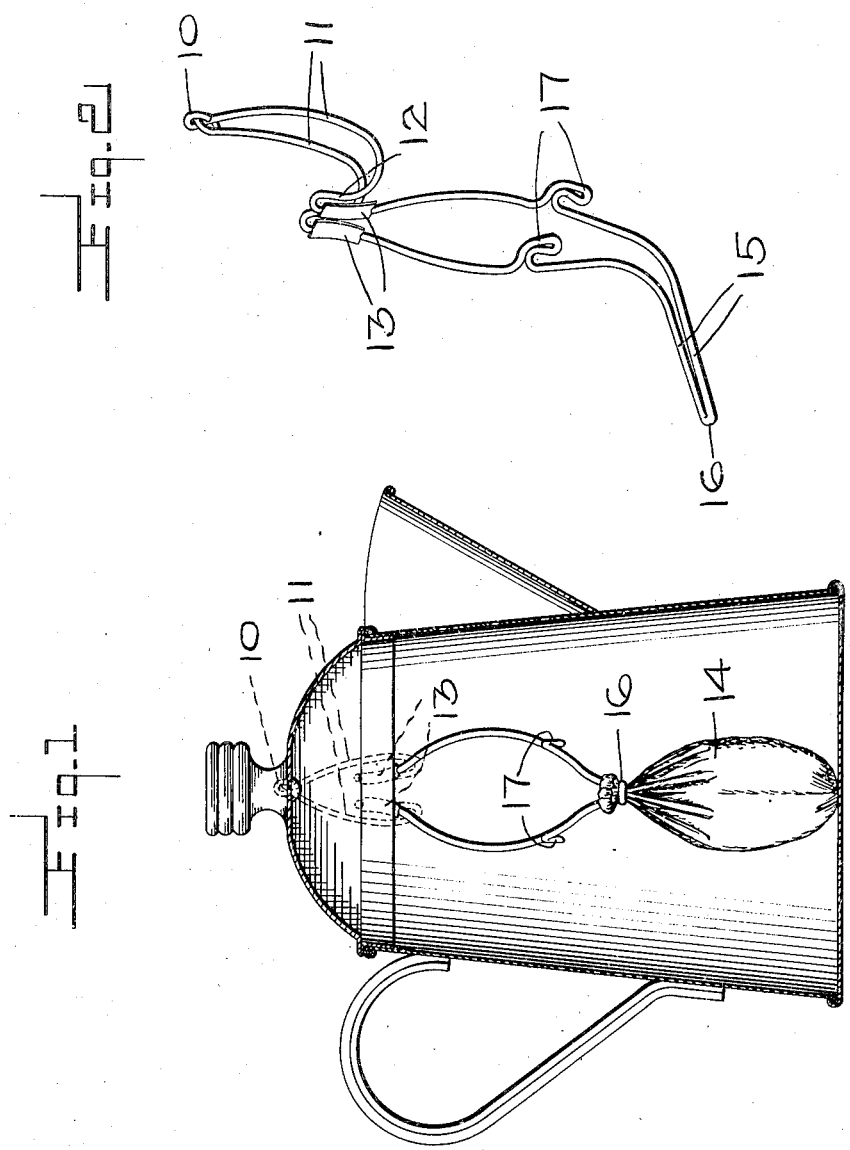
Witnesses
Ed. R. Lusby
J. Burch
Inventor
Samuel Doty
By Harry E. Chandler
Attorney

UNITED STATES PATENT OFFICE.

SAMUEL DOTY, OF VERNAL, SOUTH DAKOTA.

PERCOLATING-BAG HOLDER.

1,002,376.   Specification of Letters Patent.   Patented Sept. 5, 1911.

Application filed November 29, 1910. Serial No. 594,720.

*To all whom it may concern:*

Be it known that I, SAMUEL DOTY, a citizen of the United States, residing at Vernal, in the county of Butte and State of South Dakota, have invented certain new and useful Improvements in Percolating-Bag Holders, of which the following is a specification.

This invention relates to percolating bag holders or coffee and tea pots or the like, wherein the bag containing the coffee or tea is submerged near the bottom of the pot and in the containing water forming coffee or tea of the desired color and aroma and preventing the escape of the grounds thereinto.

A further and more important object is to provide a simple holder which may be cheaply constructed of a section of wire properly bent to tightly close the open end of the bag when wedged between two portions of the wire and thereby prevent the escape of the grounds.

A still further object is to construct the holder by bending the wire in a novel manner so as to form a clamping portion adapted to properly hold the bag in position within the pot.

The invention consists of certain other objects and arrangements of parts as will be set forth and claimed, it being understood that minor details may be changed relative to the construction of the device as will hereinafter more fully appear.

In the drawings: Figure 1 is a vertical sectional view through a receptacle with my improved bag holder applied thereto. Fig. 2 is a perspective view of the holder.

The invention as disclosed comprises a single section of wire of the desired size having its end portions 10 bent to form hooks adapted to engage each other at right angles at their upper ends and then extended or bowed outwardly as shown at 11 and curved upwardly as shown at 12 to snugly engage the peripheral surface of the pot. The wire is then bent downwardly as shown at 13 to form restricted openings adapted to receive the edge of the pot and be rigidly held thereby by forming the same in a circular line and flattened in sheet form so that the lid may be tightly closed. In order to extend and hold a sack or bag 14 centrally of the pot, the arms 15 are extended inwardly and downwardly and bowed outwardly to form an enlarged open portion which terminates in the restricted looped lower end 16, which is approximately wedge shaped and is adapted to securely hold the upper end of the sack as shown in Fig. 1 of the drawings. It will also be noted, that the lower end 16 is also bent inwardly and inclined so as to position the bag centrally of the pot and thereby insure proper cooking thereof and a thorough circulation of the boiling water through the coffee or tea.

It will thus be seen, that I have provided a holder of the character described which by reason of its simple construction may be very cheaply constructed and a cloth sack of linen or muslin may be securely held between the restricted loop to prevent the escape of the coffee or tea into the pot. Thus no sediment will collect in the cups and when the coffee has attained the desired strength, the coffee or tea may be readily removed, so that the coffee or tea will retain the proper color and aroma. The bag may be supported above the coffee or tea by hooks 17 formed above the restricted loop 16.

Having thus described my invention, what I claim is:

A device of the class described comprising a section of wire doubled upon itself to form an outwardly extending wedge shaped loop at its lower end and having its upper end bent downwardly to form a pot-engaging clamp and upwardly to form a handle portion, said wedge shaped portion being adapted to hold a bag, the upper pot-engaging portions being flattened in sheet form and hooks formed in the wire above the restricted loop.

In testimony whereof I affix my signature, in the presence of two witnesses.

SAMUEL DOTY.

Witnesses:
 ZENO F. MOSER,
 F. J. TRAVER.